Figure 1:
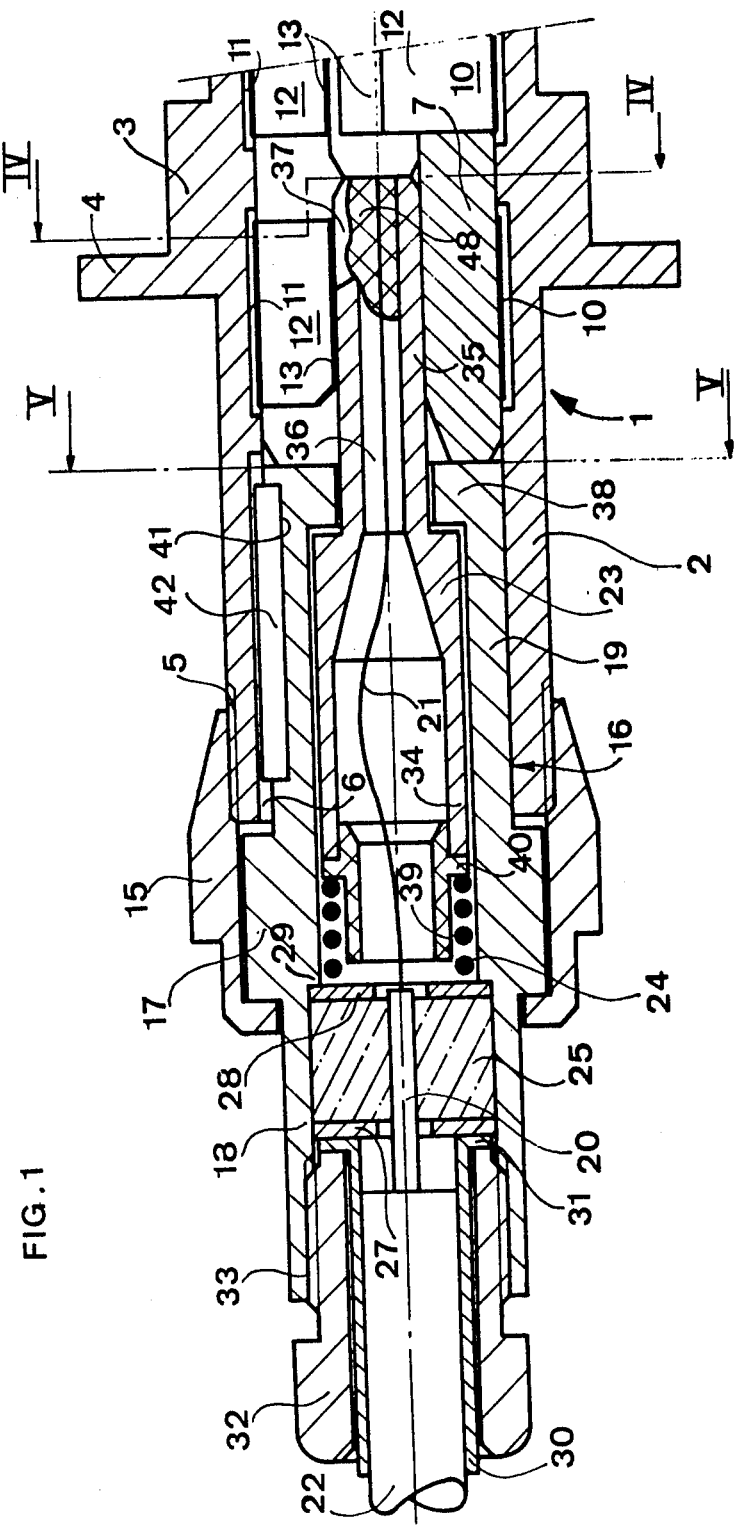

United States Patent [19]

Prunier

[11] 4,309,071

[45] Jan. 5, 1982

[54] CONNECTOR FOR OPTICAL FIBERS AND DEVICE FOR MOUNTING FIBERS ON TIPS DIRECTLY USABLE ON CONNECTORS

[75] Inventor: Jean-Claude Prunier, Herblay, France

[73] Assignee: Souriau & Cie (SA), Bolouge-Billancourt, France

[21] Appl. No.: 85,917

[22] Filed: Oct. 17, 1979

[30] Foreign Application Priority Data

Oct. 23, 1978 [FR] France ................. 78 30104

[51] Int. Cl.³ ............................................... G02B 7/26
[52] U.S. Cl. ..................................... 350/96.21; 29/721
[58] Field of Search ............... 350/96.20, 96.21, 96.22; 29/271, 468, 721

[56] References Cited

U.S. PATENT DOCUMENTS

| 3,936,145 | 2/1976 | McCartney | 350/96.22 |
|---|---|---|---|
| 3,999,841 | 12/1976 | Dakss et al. | 350/96.21 |
| 4,113,346 | 9/1978 | Jackson et al. | 350/96.21 |
| 4,140,367 | 2/1979 | Makuch et al. | 350/96.21 |
| 4,158,476 | 6/1979 | McCartney | 350/96.21 |
| 4,190,316 | 2/1980 | Malsby et al. | 350/96.21 |
| 4,192,056 | 3/1980 | Logan et al. | 350/96.21 |
| 4,195,045 | 3/1980 | Mead | 350/96.21 |
| 4,205,898 | 6/1980 | Matthews et al. | 350/96.21 |
| 4,218,113 | 8/1980 | Uberbacher | 350/96.21 |

*Primary Examiner*—John D. Lee
*Attorney, Agent, or Firm*—McAulay, Fields, Fisher, Goldstein & Nissen

[57] ABSTRACT

The connector comprises a base 1, enclosing an angle piece 7, and on which can be mounted two plugs, each comprising a tip 23 provided with a barrel 35 of square or rectangular section with bevelled edges, having a longitudinal bore 36, each barrel 35, when the plugs are assembled on base 1, being positioned against the angle piece 7 and coming face to face with one another, so that the ends of the optical fibers, each retained by gluing in a slot 37 formed at the end of each barrel 35 and opening into the longitudinal bore 36, will abut against one another.

13 Claims, 6 Drawing Figures

CONNECTOR FOR OPTICAL FIBERS AND DEVICE FOR MOUNTING FIBERS ON TIPS DIRECTLY USABLE ON CONNECTORS

The object of the present invention is a connector for optical fibers and a device for mounting fibers on tips directly usable on connectors, which constitute improvements in the object of French patent application No. 77/18675 in the name of CENTRE NATIONAL D'ETUDES DES TELECOMMUNICATIONS published on Jan. 12, 1979 under U.S. Pat. No. 2,394,823.

Equipment for mounting, on transmission cables using optical fibers, parts permitting interchangeable connections, that involve two plane surfaces, perpendicular to one another, and thus constituting surfaces of reference, against which are applied two identical support pieces, of parallelpiped form, and having a V-shaped groove with axis parallel to the two surfaces, in the bottom of which the optical fiber is held, so that on bringing the support pieces together, the fibers are placed end to end, are already known.

These known units, which are delicate to machine, hence expensive and difficult to apply, have remained essentially laboratory units, and have not been developed in the form of connectors that are fast and easy to utilize, particularly on the worksite, and of reasonable cost price.

The basic problem of the present invention consists in the design of such a connector, as well as a device for mounting optical fibers on tips that can be directly and rapidly mounted and used on such a connector.

With this in mind, the connector for optical fibers according to the invention, comprise a base, on either side of which two plugs can be made solid, each bearing one end of the optical fibers to be connected, is characterized in that the base has a base body of generally tubular shape, inside which an angle piece is held, and in that each plug comprises a tip provided with a barrel of square or rectangular section with beveled edges, having a longitudinal bore, and when the plugs are assembled on the base the barrels are each positioned against the angle piece and face one another, so that the ends of the optical fibers, each retained by gluing in a slot formed at the end of each barrel, and opening into the axial bore, will abut against one another.

Furthermore, the positioning of the barrels facing one another is facilitated by the fact that each of the barrels is applied, independently of the other, against the angle piece, by elastic means held in the base body.

In an advantageous form of embodiment, which permits an end to end mounting of the barrels of the tips with sufficient contact pressure to insure good transmission of the light signal between the facing ends of the optical fibers, each barrel is borne by a hollow tip base, traversed by the fiber issuing from the longitudinal bore of the barrel, and by which the tip is received in a plug body in which it can move axially against elastic means pressing against sheath retaining means, surrounding the optical fiber, and a cable for mechanical protection of the sheath, these means of retention being fixed in the plug body by a cable-tightening nut screwed on the plug body at one of its ends, the other end being traversed by the barrel of the tip. And finally each plug body can be positioned, by its part receiving the base of the tip, in one end of the tubular base body, by means of mechanical elements preventing any rotation of the plug body relative to the base body, the latter being made solid with one another by a connecting nut, and mounted in such a way that the play between the plug body and the base body will be less than the play between the tip and the plug body, so that the positioning of the plug bodies in the base body will not disturb the positioning of the barrels of the tips, mounted, so to speak, "floating" in the plug bodies, against the angle piece, and facing one another, under the influence of elastic means provided for this purpose in the base body.

Preferably, these elastic means consist of two elastic clips surrounding the angle piece, and having curved ends, bent toward the inside of the angle piece, each to repel one barrel against the angle piece, in the two directions perpendicular to the axis of the fiber. The means of retention for the sheath and the cable can comprise a stuffing-box, disposed between two washers, and having a central bore in which the sheath is retained, the elastic means against which the tip can move, pressing against one of the washers, positioned against an internal shoulder in the plug body, and a ferrule crimped on the cable being held against the other washer by the cable-clamping nut screwed on the plug body, likewise it will be advantageous to provide a stroke limiter to limit the axial displacements of the tip in the plug body, in order to contain the retraction of the tip within an acceptable range in the plug body, when the plug is handled without being mounted on the base, in order neither to overload nor excessively buckle the part of the fiber received in the tip, which could cause it to break or develop microcurves on it, giving rise to transmission losses called "losses of insertion." The device according to the invention, which is designed to permit the mounting of an optical fiber on a tip received in a connector plug according to the invention, is characterized in that it comprises a block on which have been rectified two perpendicular planes consititruting an angle piece against which is applied a centering element, of which one face, not in contact with the angle piece, has a V-shaped groove, parallel to the edge of the angle piece, and at the bottom of which is retained an optical fiber, issuing from the barrel of the tip, and subjected to the effect of elastic means tending to draw the fiber out of the barrel, which is applied against the angle piece and against one side of the centering element, so that by introduction of glue into the end slot of the barrel, the end of the fiber is immobilized at the end of the barrel, in an identical position for all barrels applied against the centering element on the same side of the latter. Furthermore, a pressure needle, mounted slidingly on the block and urged elastically toward the V-shaped groove of the centering element, itself applied against the angle piece by a wedge, holds the fiber in the bottom of this V-shaped groove, and the barrel of the tip, positioned against one side of the centering element, is applied against the angle piece by that one of the two arms mounted swingably on the block, on either side of the centering element, which is on the same side of the latter as the barrel. And finally, the block is traversed by two guide bars parallel to the edge of the angle piece and supporting, on one side of the block, the plug receiving the tip in question, and, on the other side of the block, a fiber holder, constituted by a base having a V-shaped groove, in the extension of that of the centering element, on which a finger, holding the fiber against the base, can be lowered, the said base, mounted slidingly on guides, is elastically urged away from the block by two springs, mounted on the guides and pressing against the block, and constituting the elastic means tending to draw the fiber out of the barrel. With the aid of this device, and from tips, apparently all identical, which is true within 0.01 mm, it is thus possible to proceed with the mounting of the fibers at the end of tips which are, in fact, symmetrical to the planes of reference of the angle piece, within one micron, after the gluing of the fiber. As a result, tips are obtained which can be labelled "left" tips and "right" tips with reference to FIG. 1, these tips being placed either on the "left" side or on the "right" side of the centering element for the mounting of the fiber.

Figure 2:
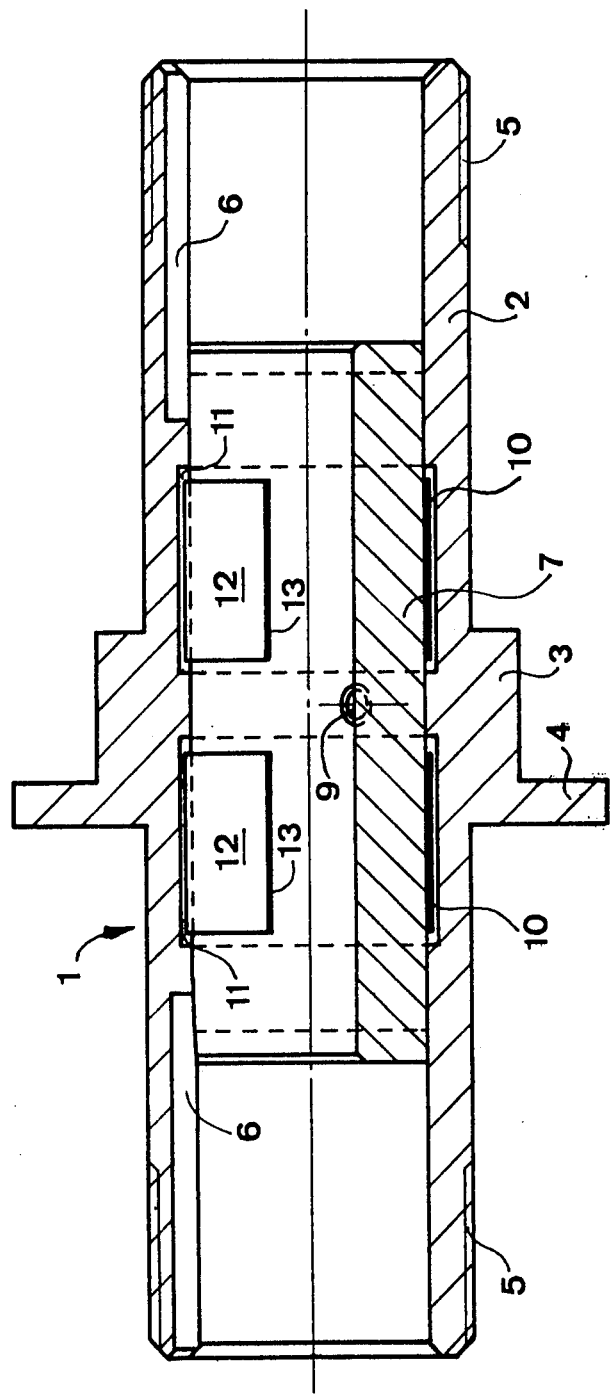
Figure 3:
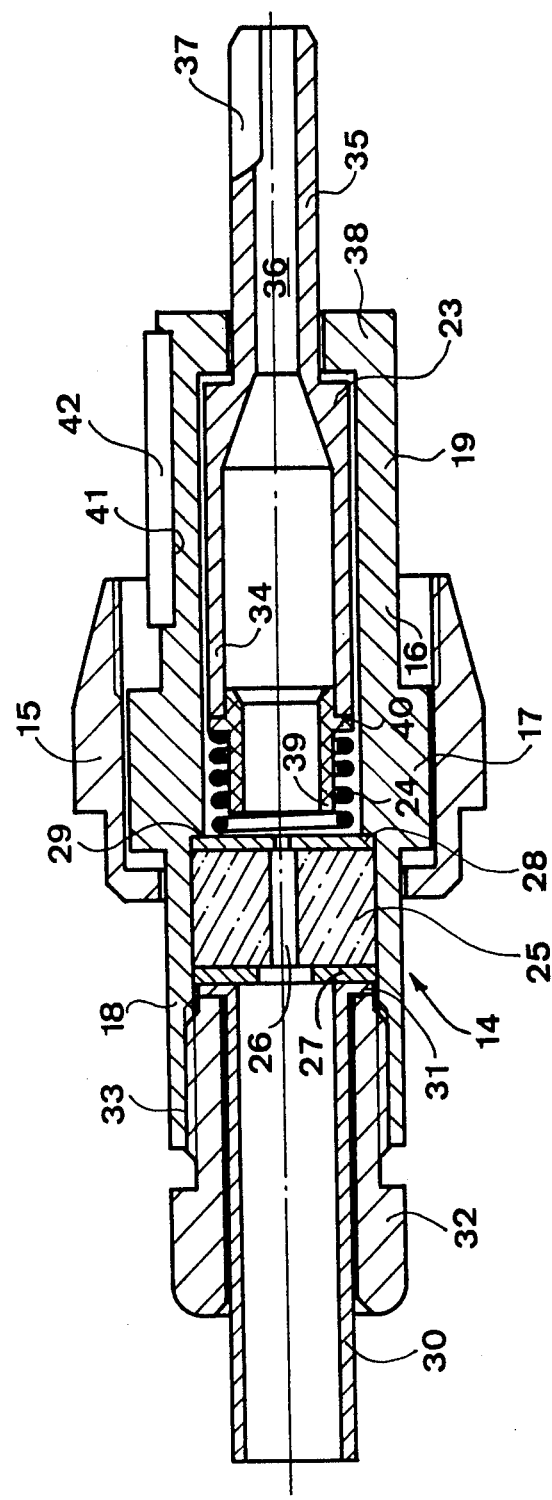
Figure 5:
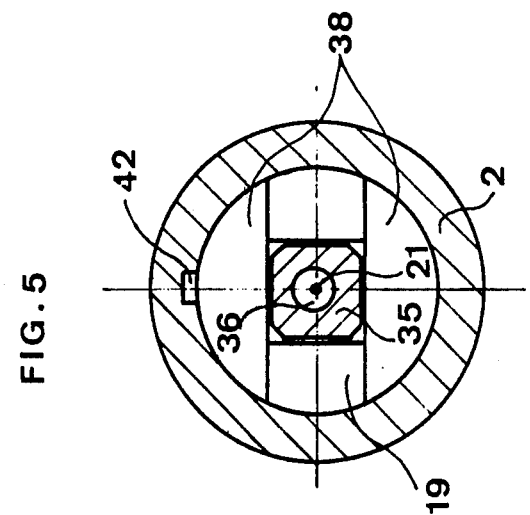
Figure 4:
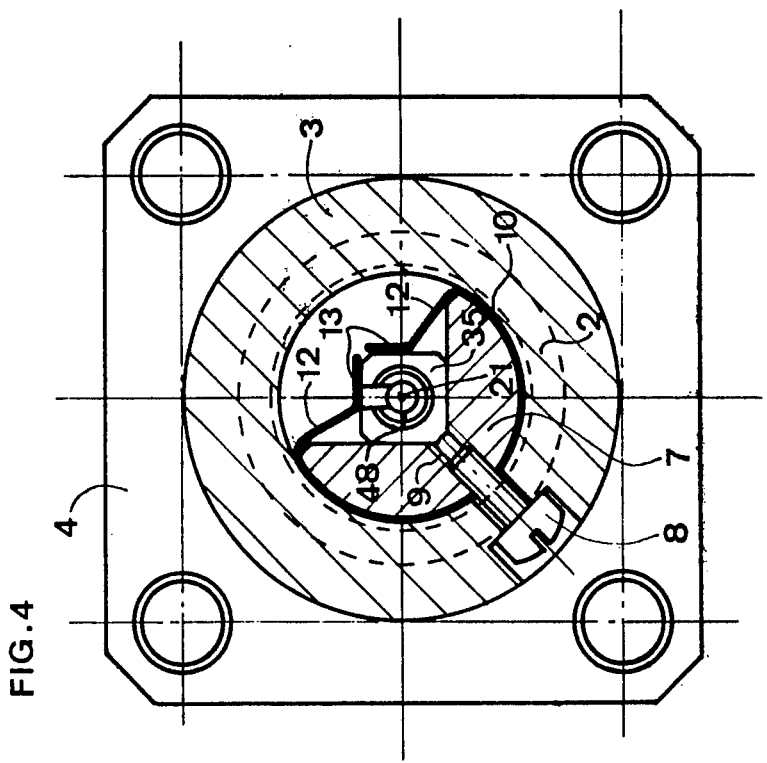
Figure 6:
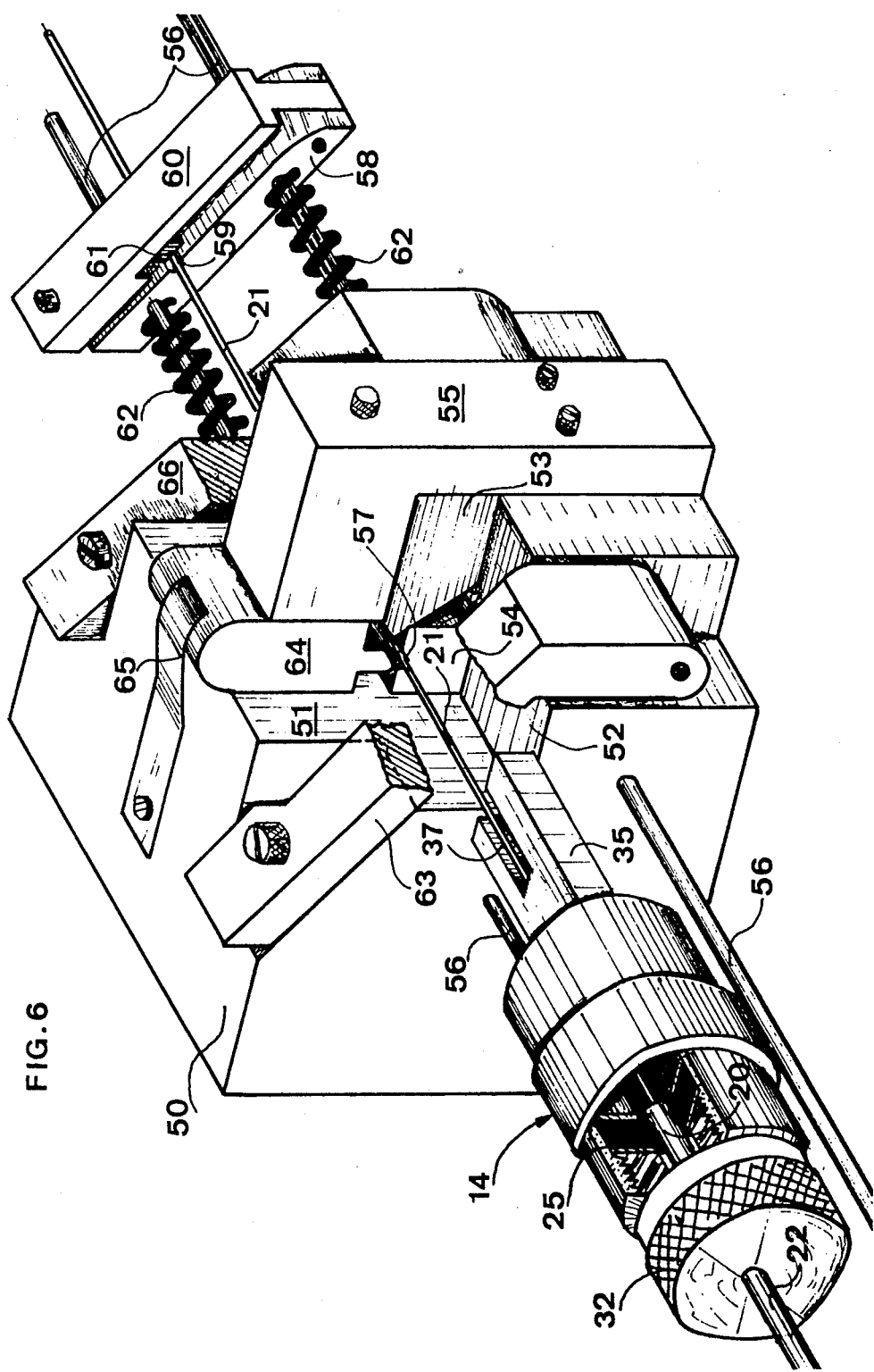

The present invention will be better comprehended with the aid of a particular example of embodiment which will be described below, in non-limiting fashion, with reference to the attached figures in which:

FIG. 1 represents a view in axial section of a connector embodying the connection of two optical fibers, FIGS. 2 and 3 represent two views in axial section, of a base and a connector plug according to FIG. 1, respectively, FIGS. 4 and 5 represent views along sections IV—IV and V—V in FIG. 1, And FIG. 6 represents a perspective view, partly exploded, of a plug and a connector tip according to the invention, cooperating with a device for mounting an optical fiber on the tip.

Referring to FIGS. 1 to 5, the connector comprises a base 1 having a base body 2, of generally tubular form, as well as an outer shoulder 3 and a flange 4, designed to permit the fixation of the base 1 on a support which is not shown.

At each of its ends, the tubular base body 2 has, on its outer face, a connecting thread 5, and on its inner face, a longitudinal groove 6. An angle piece 7 is retained in the interior of base body 2 by a screw 8, passing through shoulder 3, base body 2, and received in a threaded passage 9 formed in angle piece 7. Angle piece 7 is surrounded by two elastic metal clips 10, lodged in chambers 11 machined in the interior of base body 2. Each clip 10 has ends 12 curved in the form of a spur 13, and the ends 12 are bent toward the interior of angle piece 7. Through each of its ends, the tubular base body 2 can receive a plug 14 bearing a connecting nut 15 which, as it is screwed onto thread 5 of base body 2, insures the fixation of plug 14 on base 1. Plug 14 comprises a plug body 16, constituted by a shoulder 17 to hold connecting nut 15, on either wide of which there are two tubular portions 18 and 19, one of which, 18, is designed to receive means of retention of a sheath 20 surrounding an optical fiber 21, and a cable 22 for mechanical protection of sheath 20, and the other, 19, is designed to lodge a tip 23 and a spring 24. The means of retention of sheath 20 are constituted by a stuffing-box 25 having a central bore 26, and disposed between two washers 27 and 28, of which the one, 28, is applied against the internal shoulder 29 of plug body 16. The means of retention of cable 22 are constituted by a ferrule 30 crimped or to be crimped around cable 22, one end, 31, of which is pinched between washer 27 and a cable-clamping nut 32 which screws on the internal thread 33 at the end of the tubular portion 18 of plug body 16. The screwing of cable-clamping nut 32 insures, simultaneously, the retention of ferrule 30 crimped around cable 22, and the compression between washers 27 and 28 of the stuffing-box 25 that grips and retains sheath 20. Tip 23 is constituted by a hollow base 34, traversed by a stripped part of the optical fiber 21, and bearing a barrel 35 of square or rectangular section, with beveled edges, having a longitudinal bore 36 into which an end slot 37 opens, the end of the optical fiber 21 being received in longitudinal bore 36 of barrel 35, and being immobilized at its end by a block of glue 48 previously introduced through slot 37, as will be explained below. Tip 23 is mounted in plug body 16 in such a way that base 34 will be received in tubular portion 19 and that the barrel 35 will pass through a base 38 of plug body 16, base 34 being able to slide in tubular portion 19 against spring 24, pressing on one side against washer 28 and on the other against annular stop 40 of a sleeve 39 traversed by fiber 21, received in the free end of base 34 of tip 23, and serving as a stroke limiter for the movements of retraction of tip 23 in plug body 16, which, if they were too extensive, particularly during the manipulations of plug 14 before being connected on base 1, would lead to overloads and excessive buckling of the part of fiber 21 situated in base 34, which could lead to breakage of fiber 21 or to the formation on the fiber of microcurves producing insertion losses.

Plug body 16 also has, on its tubular portion 19, an accommodation 41 for a key 42.

During the assembly on base 1, of two plugs 14, on which a tip 23, holding the end to be connected, of a fiber 21, as well as a spring 24 and the various means of retention of cable 22 and sheath 20, have previously been mounted, the tubular portions 19 are introduced into the tubular base body 2, the keys 42 being lodged in grooves 6 and preventing any relative rotation of plug body 16 in base body 2. The barrels 35 of tips 23 then come to face one another and each is applied by one of the elastic clips 10 against angle piece 7, the spurs 13 of the bent ends 12 acting in both directions perpendicular to the longitudinal axis of the connector. Since the assembly play of plug body 16 in base body 2 is less than the assembly play of tip 23 in plug body 16, the barrels 35 will therefore abut exactly against one another, and by screwing the connecting nuts 15 on the threads 5 of base 1, the barrels 35 are applied against one another with sufficient pressure to insure good transmission between the ends of fibers 21, the elastic retraction of tips 23 in plug body 16 preventing excessive contact pressures, which would damage the fibers 21.

Referring to FIG. 6, the particular device designed to permit the mounting of an optical fiber 21 on the barrel 35 of a tip received in a plug 14 of the connector described in reference to FIGS. 1 to 5, is constituted by a block 50, in which two planes 51 and 52, perpendicular to one another, have been rectified, constituting an angle piece against which a centering wedge 53 applies a centering element 54, the wedge 53 being itself maintained on block 50 by support 55 which can be made solid with the latter. Block 50 is traversed by two guide bars 56, parallel to the edge of the angle piece, and on which a plug 14 can be disposed on which the cable-clamping nut 32 holds cable 22, surrounding sheath 20, retained by stuffing-box 25, of fiber 21, which issues from the barrel 35 of the tip received in plug 14, passes through a V-shaped groove 57 formed in centering element 54, and is retained on the base 58 of a fiber-holding element, having a V-shaped groove 59, in the extension of groove 57, by a finger 60, rocking on base 58, and provided with a buffer 61 clamping fiber 21 against base 58 when finger 60 is made solid with base 58, which is mounted slidingly on the two guide bars 56, and is elastically separated from block 50 by two springs 62 mounted on guide bars 56 and pressing against block 50. These springs 62 constitute elastic means tending to draw fiber 21 out of barrel 35. After plug 14 has been displaced toward block 50 on bars 56, to the end of barrel 35, which has slid on rectified plane 52, is in contact on the side of centering element 54, the arm 63 mounted to rock on block 50, is then made solid with block 50, to apply barrel 35 against rectified planes 51 and 52, and give it a suitable position against the angle piece, in contact with centering element 54. Now that fiber 21 is held at the bottom of groove 57 by a pressure needle 64, mounted slidably on block 50, between the latter and the support 55, and urged elastically by leafspring 65 toward centering element 54, it is possible to proceed with the gluing of fiber 21 on barrel 35, by introducing a drop of glue into slot 37 formed at the end of barrel 35. After drying, fiber 21 can be released from the fiber holder, and plug 14 can be withdrawn to cut fiber 21 at the end point of barrel 35. FIG. 6 shows the barrel 35 of a tip applying against the left face of centering element 54, but plug 14 can be mounted on guide bars 56 in such a way that barrel 35 is applied against the right face of centering element 54, springs 62 and base 58 of the fiber holder being then mounted on bars 56 to the left of the centering element 54, and barrel 35 being positioned by rocking arm 66 symmetrically to arm 63 relative to centering element 54. In so doing, two families of tips can be obtained which can be called "left" and "right", identical to one another within 0.01 mm, symmetrical from one family to the next relative to the planes of reference, and identical in a family within 1 micron, after the fiber is glued.

To distinguish the "left" tips from the "right" tips, it will be advantageous to provide "left" plug bodies and "right" plug bodies differing from one another by the position of keys 42 in grooves 6, which can be multiple, respectively, on the plug body and on the base body, in such a way as to insure against mistakes. For example, each tubular end of the base body can have three grooves 6 at 120°, two of them at the "left" end, receiving two keys 42 of a "left" plug body, while two grooves of the "right" end, one of which is not situated in the extension of the two occupied grooves 6 of the "left" extension, receive two keys 42 of a right plug body.

The device for mounting fibers on tips according to the present invention, permits the use of connectors according to the invention, which are easy to apply and simple in construction, whenever fiber to fiber connections are to be made.

I claim:

1. In combination, a pair of optical fiber mounting plugs, and a connector for optical fibers to connect the pair of optical fiber mounting plugs,
   wherein each said plug comprises:
   a plug body, elastic means therein, and retention means for said elastic means;
   a tip including a barrel of non-circular cross-section having a longitudinal bore, said barrel having a slot opening into said bore;
   at least one optical fiber contained within said bore and extending to the edge of said barrel, and means fixedly securing at least one said optical fiber to said barrel in said slot;
   a sheath surrounding said optical fiber and a cable providing mechanical protection to said sheath in said plug body, said retention means holding said sheath in said plug body and including a pair of spaced washers and a stuffing body having a central bore disposed between said pair of washers, said sheath being retained in said central bore, said elastic means in response to movement thereagainst by said tip being urged against one of said washers, said plug body having an inner shoulder for locating said one washer in juxtaposition to said elastic means, and a ferrule crimped onto said cable retained against said other washer by said cable-clamping unit;
   a cable-clamping nut screwed onto said plug body at one end thereof:
   each said barrel including a hollow tip base which is traversed by said at least one optical fiber contained within said bore, said hollow tip base being received within said plug body at the other end thereof and said barrel being guided therein for axial movement and axially movable against said elastic means pressing thereagainst; and,
   said connector includes:
   a base body of generally regular shape, and an angle piece retained within said base body to control the positioning of said pair of said plugs in face to face relationship with each other so that the ends of each of at least one of said optical fibers retained by said fixing means in said barrel are brought in face to face abutting relationship.

2. The combination as claimed in claim 1 including elastic means in said base body, for retaining each of said plugs separately and independently of each other against said angle piece.

3. The combination as claimed in claim 1 wherein said elastic means includes an elastic clip for each said plug surrounding said second-mentioned angle piece and having curved ends bent toward the interior thereof so that each clip will urge the barrel of its said plug against said angle piece.

4. In combination, a pair of optical fiber mounting plugs, and a connector for optical fibers to connect the pair of optical fiber mounting plugs,
   wherein each said plug comprises:
   a plug body, elastic means, therein, and retention means for said elastic means;
   a tip including a barrel of non-circular cross-section having a longitudinal bore, said barrel having a slot opening into said bore;
   at least one optical fiber contained within said bore and extending to the edge of said barrel, and means fixedly securing at least one of said optical fibers to said barrel in said slot;
   a sheath surrounding said optical fiber and a cable in said plug body;
   a cable-clamping nut screwed onto said plug body;
   said retention means includes a pair of spaced washers and a stuffing box having a central bore disposed between said pair of washers, said sheath being retained in said central bore, said elastic means in response to movement thereagainst by said tip being urged against one of said washers, said plug body having an inner shoulder for locating said one washer in juxtaposition to said elastic means, and a ferrule crimped onto said cable retained against said other washer by said cable-clamping nut;
   said connector includes:
   a base body of generally tubular shape, and an angle piece retained within said base body to control the positioning of said pair of said plugs in face to face relationship with each other so that the ends of each of at least one of said optical fibers retained by said fixing means in said barrel are brought in face to face abutting relationship.

5. The combination as claimed in claim 1 or 4, including a stroke limiter to limit the axial displacements of said tip in said plug body.

6. The combination as claimed in claim 5, wherein said base body is provided at an entry portion thereof with a longitudinal slot, said plug body includes an accomodation and a key positioned within said tubular base body and cooperating with said longitudinal slot for preventing rotation of said plug body relative to said base body, and a connecting nut connecting said base body to said plug body so that play between said plug body and said base body is less than the play between said tip and said plug body.

7. A device for mounting an optical fiber on a tip of a barrel adapted to be received in a plug which is connectable with another fiber mounted plug by a plug connector comprising a block having two perpendicular planes which have been rectified to constitute an angle piece, a centering element applied against said angle piece, said centering element having one face of which is free of contact with the angle piece, said one face having a V-shaped groove parallel to the edge of said angle piece for holding an optical fiber issuing from the barrel of the tip at the bottom of said V-shaped groove, elastic means affecting the fiber for drawing thereof out of the barrel two sides of which are applied against said angle piece and against one side of said centering element so that by introduction of glue into an end slot between the fiber and barrel, the end of the fiber is immobilized at the end of the barrel in a position that is identical for all barrels applied against said centering element on the same side of the latter, a pressure needle mounted slidingly on said block and elastically urged toward said V-shaped groove, said pressure needle holding the fiber at the bottom of said V-shaped groove, a wedge for applying said centering element against said angle piece, two guide bars for positioning one side of the barrel with the tip for positioning the fiber against said one side of said centering element and applying the barrel against said angle piece, at least one of said guide bars being mounted to rock on said block on either side face to said centering element, said tip being on the same side of the side face of said centering element as the barrel, two guide bars parallel to the edge of said angle piece traversing said block and supporting the plug receiving the tip, on one side of said block, a fiber holder on the other side of said block including a base having V-shaped groove aligned with and forming an extension of the first-mentioned V-shaped groove of the centering element, said fiber holder including a locking finger for the fiber and means for lowering said fiber holder against the base slidably mounted on said guide bars, and said elastic means including two springs elastically separating said fiber holder from said block mounted on guides pressing against said block for drawing the fiber out of the barrel.

8. An optical fiber mounting plug for use with a connector for connecting optical fibers mounted in a pair of optical fiber mounting plugs, comprising:

a tip including a barrel of non-circular cross-section having a longitudinal bore, said barrel having a slot opening into said bore;

at least one optical fiber contained within said bore and extending to the edge of said barrel, and means fixedly securing at least one said optical fiber to said barrel in said slot;

a plug body, elastic means therein, and retention means for said elastic means;

a sheath surrounding said optical fiber and a cable providing mechanical protection to said sheath in said plug body, said retention means holding said sheath in said plug body; and a cable-clamping nut screwed onto said plug body at one end thereof;

said retention means includes a pair of spaced washers and a stuffing box having a central bore disposed between said pair of washers, said sheath being retained in said central bore, said plug body having an inner shoulder for locating said one washer in juxtaposition to said elastic means, said elastic means in response to movement thereagainst by said tip being urged against one of said washers; and a ferrule crimped onto said cable retained against said other washer by said cable-clamping nut.

9. The plug as claimed in claim 8, wherein said barrel includes a hollow tip base which is traversed by said at least one optical fiber contained within said bore, and said hollow tip base is received within said plug body at the other end thereof and said barrel is guided therein for axial movement and axially movable against said elastic means pressing thereagainst.

10. The plug as claimed in claim 8 or 9, including a stroke limiter to limit the axial displacements of said tip in said plug body, and, an accommodation in said plug body adapted to cooperate with a key positioned within a tubular base body of a connector for connecting two plugs and cooperating with a longitudinal slot in the connector for preventing rotation of said plug body relative to the base body of the connector.

11. An optical fiber cable connector for a pair of optical fiber cables comprising:

a plug having a transverse hollow body, a sheath support in said transverse hollow body at one end thereof, a first optical fiber part within said sheath support and a second unsheathed optical fiber part in said transverse hollow body, retention means for securing said sheath support at said one end of said hollow body in said plug, a barrel slidably arranged substantially at the other end of said hollow body, means for securing the extremity of said second unsheathed optical fiber part on said barrel, means for generating an elastic force between said securing means and said barrel, said cables each being mounted in its respective plug carrying optical fibers which are to be connected together, and comprising:

a base body of generally tubular shape and being provided at an entry position thereof with a longitudinal slot, an angle piece adapted to surround said barrel and being retained within said base body to control the positioning of a pair of said plugs in face to face relationship with each other so that the ends of each of at least one of the optical fibers retained by said retention means in said plugs are brought in face to face abutting relationship;

elastic means in said base body, for retaining each of said plugs separately and independently of each other against said angle piece, said elastic means including an elastic clip for each said plug surrounding said angle piece and having curved ends bent toward the interior thereof so that each clip will urge said barrel against said angle piece;

a key positioned within said tubular base body and cooperating with said longitudinal slot and an accommodation in said plugs for preventing rotation thereof relative to said base body; and, a connecting nut connecting said base body to said plugs so that play between the plugs and said base body is less than the play between a tip of each of said plugs and the plug.

12. An optical fiber cable connector for a pair of optical fiber cables comprising:

a plug having a transverse hollow body, a sheath support in said transverse hollow body at one end thereof, a first optical fiber part within said sheath support and a second unsheathed optical fiber part in said transverse hollow body, retention means for securing said sheath support at said one end of said hollow body in said plug, a barrel slidably arranged substantially at the other end of said hollow body, means for securing the extremity of said second unsheathed optical fiber part on said barrel;

means for generating an elastic force between said securing means and said barrel;

each of the cables being mounted in its respective plug, and each of the plugs carries optical fibers in the cables which are to be connected together and further comprising:

a base body of generally tubular shape and being provided at an entry portion thereof with a longitudinal slot, and an angle piece adapted to surround said barrel and being retained within said base body to control the positioning of a pair of said plugs in face to face relationship with each other so that ends of each of at least one of the optical fibers retained by said retention means in said plugs are brought into face to face abutting relationship.

13. The connector as claimed in claim 12, including:

elastic means in said base body, for retaining each of said plugs separately and independently of each other against said angle piece, said elastic means including an elastic clip for each said plug surrounding said angle piece and having curved ends bent toward the interior thereof so that each clip will urge a barrel forming part of said plug against said angle piece.

* * * * *